UNITED STATES PATENT OFFICE.

FRIEDRICH BAYER, OF ELBERFELD, GERMANY, ASSIGNOR TO FARBENFABRIKEN, VORMALS FRIEDR. BAYER & CO., OF SAME PLACE.

MANUFACTURE OF DYE-STUFFS OR COLORING-MATTERS.

SPECIFICATION forming part of Letters Patent No. 395,474, dated January 1, 1889.

Application filed January 17, 1887. Serial No. 224,599. (Specimens.)

*To all whom it may concern:*

Be it known that I, FRIEDRICH BAYER, a subject of the King of Prussia, residing at Elberfeld, in the Empire of Germany, director and assignor to the FARBENFABRIKEN, VORMALS FRIEDR. BAYER & CO., have invented a new and useful Improvement in the Manufacture of Dye-Stuffs or Coloring-Matters, of which the following is a specification.

My invention relates to the production of new red coloring-matters for dyeing cotton, wool, and silk by the action of tetrazo compounds of paradiamines upon a new sulphonic acid of betanaphthylamine, which I have called "betanaphthylaminedeltamonosulpho acid," and which will be gained in the following manner: Fifty kilos naphthylamine or salts of betanaphthylamine are added to one hundred and fifty kilos sulphuric acid, heated from 150° to 170° centigrade, and maintained at this temperature until (generally after about one hour) the sulphonizing is completed. Now pour the solution on ice and allow the sulpho-acid separating to stand for some time, filter, dissolve the residue in soda-lye, add to the so-formed soda-salt solution heated to 80° centigrade sulphuric acid, and filter once more. Thereby a large part of a new sulphonic acid goes into a solution, whereas the greatest part of the betanaphthylaminebetamonosulpho acid, likewise produced, remains. The new sulpho-acid now crystallizes in needles and can be gained pure by repeating this manipulation, forming the baryta or sodium salts and crystallizing them several times. This new sulpho-acid I call "betanaphthylaminedeltamonosulpho acid." By the action of tetrazo compounds of diparadiamines upon this new sulpho acid new red dye-stuffs can be obtained, which distinguish themselves materially from the dye-stuffs of the other betanaphthylaminemonosulpho acids known up to the present.

In carrying out my process to produce the new coloring-matter practically I proceed as follows:

*Example* I.—Fifty kilos benzidin sulphate are suspended in a finely-comminuted condition, with fifty kilos muriatic acid of 21° Baumé, and diazotized by the acid of an aqueous solution of 22.2 kilos of sodium nitrate. The tetrazodiphenylchloride is now formed. This solution is slowly added to seventy-three kilos betanaphthylaminedelta-monosulpho acid suspended in a finely-comminuted condition in water, blending the free mineral acid by the addition of acetate of sodium, and thereby obtains an orange-red precipitation, which is transformed into its alkali salt by warming and neutralizing with alkali. When cold, an orange-red powder is obtained, which dyes cotton without any mordant a very fine yellowish red, and has the formula of

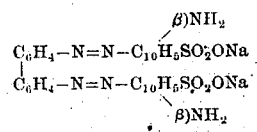

*Example* II.—By the action of tetrazoditolyl upon my new sulpho-acid a very fine bluish-red dye-stuff fast to acid is obtained. Fifty kilos of tolidin are converted in the well-known manner into the muriatic-tetrazo compounds. A solution of the same in one thousand liters of water is entered into a solution containing seventy-three kilos betanaphthylaminedeltamonosulpho acid and one hundred and fifty kilos of acetate of soda. If the mixture is now stirred for a longer period or heated, an azo color is formed, which is soluble in alkalies and which dyes shades more bluish than the product gained from tolidin and all other well-known sulpho-acids of betanaphthylamine, and in particular the products of the betanaphthylaminebetamonosulphonic acid.

In all cases the salts of tetrazoditolyl may be replaced by salts of the tetrazodiphenyl-ether, tetrazostilben, or their sulphonic acids. I do not in this application claim the products described, having made a separate application therefor.

What I claim as my invention, and desire to secure by Letters Patent, is—

The process of producing new red azo colors, which consists in combining a new monosulpho acid of betanaphthylamine, called "betanaphthylaminedeltasulpho acid," with the group of tetrazo compounds of paradiamines, such as tetrazodiphenyl, tetrazoditolyl, tetrazodiphenylether, tetrazostilben, or their sulphonic acids, substantially as described.

FRIED. BAYER.

Witnesses:
WM. A. POLLOCK.
GEO. T. CURTIS, Jr.